United States Patent [19]

Honnen

[11] 4,247,301
[45] Jan. 27, 1981

[54] DEPOSIT CONTROL AND DISPERSANT ADDITIVES

[75] Inventor: Lewis R. Honnen, Petaluma, Calif.

[73] Assignee: Chevron Research Company, San Francisco, Calif.

[21] Appl. No.: 917,150

[22] Filed: Jun. 19, 1978

Related U.S. Application Data

[63] Continuation-in-part of Ser. No. 832,491, Sep. 12, 1977, abandoned, which is a continuation-in-part of Ser. No. 730,485, Oct. 7, 1976, abandoned, which is a continuation-in-part of Ser. No. 700,923, Jun. 29, 1976, abandoned.

[51] Int. Cl.³ .............................................. C10L 1/22
[52] U.S. Cl. .......................................... 44/63; 44/72; 564/505
[58] Field of Search .................. 44/72, 63; 260/584 B

[56] References Cited

U.S. PATENT DOCUMENTS

| | | | |
|---|---|---|---|
| 3,440,029 | 4/1969 | Little et al. | 44/75 |
| 3,960,515 | 6/1976 | Honnen | 44/72 |

*Primary Examiner*—Winston A. Douglas
*Assistant Examiner*—Y. Harris-Smith
*Attorney, Agent, or Firm*—D. A. Newell; S. R. LaPaglia

[57] ABSTRACT

Additives for internal combustion engines are provided which in fuels maintain cleanliness of intake system without contributing to combustion chamber deposits and in lubricating oils act as dispersants. The additives are hydrocarbylpoly(oxyalkylene) polyamines comprising a hydrocarbyl-terminated poly(oxyalkylene) chain of 2-5 carbon oxyalkylene units bonded to a nitrogen atom of a polyamine having from 2 to 12 amine nitrogens and from 2 to 40 carbon atoms with a carbon:nitrogen ratio between 1:1 and 10:1.

16 Claims, No Drawings

DEPOSIT CONTROL AND DISPERSANT ADDITIVES

CROSS-REFERENCE TO RELATED APPLICATIONS

This application is a continuation-in-part of U.S. application Ser. No. 832,491, filed Sept. 12, 1977, now abandoned which in turn is a continuation-in-part of application Ser. No. 730,485, filed Oct. 7, 1976, now abandoned which in turn is a continuation-in-part of application Ser. No. 700,923, filed June 29, 1976 now abandoned.

BACKGROUND OF THE INVENTION

1. Field of the Invention

In recent years, numerous fuel detergents or "deposit control" additives have been developed. These materials when added to hydrocarbon fuels employed in internal combustion engines effectively reduce deposit formation which ordinarily occurs in carburetor ports, throttle bodies, venturis, intake ports and intake valves. The reduction of these deposit levels has resulted in increased engine efficiency and a reduction in the level of hydrocarbon and carbon monoxide emissions.

A complicating factor has, however, recently arisen. With the advent of automobile engines that require the use of nonleaded gasolines (to prevent disablement of catalytic converters used to reduce emissions), it has been found difficult to provide gasoline of high enough octane to prevent knocking and the concomitant damage which it causes. The chief problem lies in the area of the degree of octane requirement increase, herein called "ORI," which is caused by deposits formed in the combustion chamber while the engine is operating on commercial gasoline.

The basis of the ORI problem is as follows: each engine, when new, requires a certain minimum octane fuel in order to operate satisfactorily without pinging and/or knocking. As the engine is operated on any gasoline, this minimum octane increases and, in most cases, if the engine is operated on the same fuel for a prolonged period, will reach an equilibrium. This is apparently caused by an amount of deposits in the combustion chamber. Equilibrium is typically reached after 5000 to 15,000 miles of automobile operation.

The octane requirement increase in particular engines used with commercial gasolines will vary at equilibrium from 5 or 6 octane units to as high as 12 or 15 units, depending upon the gasoline compositions, engine design and type of operation. The seriousness of the problem is thus apparent. A typical 1975 or 1976 automobile with a research octane requirement of 85 when new may after a few months of operation require 97 research octane gasoline for proper operation, and little unleaded gasoline of that octane is available. The ORI problem exists in some degree with engines operated on leaded fuels. U.S. Pat. Nos. 3,144,311 and 3,146,203 disclose lead-containing fuel compositions having reduced ORI properties.

It is believed, however, by many experts that the ORI problem, while present with leaded gasolines, is much more serious with unleaded fuel because of the different nature of the deposits formed with the respective fuels, the size of increase, and because of the lesser availability of high-octane non-leaded fuels. This problem is compounded by the fact that the most common means of enhancing the octane of unleaded gasoline, increasing its aromatic content, also appears to increase the eventual octane requirement of the engine. Furthermore, some of the presently used nitrogen-containing deposit control additives and the mineral oil or polymer carries commonly used with such additives appear to contribute significantly to the ORI of engines operated on unleaded fuel. It is, therefore, highly desirable to provide deposit control additives which effectively control deposits in intake systems (carburetor, valves, etc.) of engines operated with fuels containing them, but do not contribute to the combustion chamber deposits which cause increased octane requirements. While, in general, deposit control additives are not believed to be useful dispersants for lubricating oil compositions, certain selected additives of the present invention are believed to be useful dispersant additives for lubricating oils.

2. Description of the Prior Art

West German patent application No. 2,401,930, filed Jan. 16, 1974, opened July 24, 1975, discloses polyalkylene glycol polyamines in which the polyalkylene glycol radical is terminated with a hydroxyl group. The compounds are employed as deposit control additives in fuels. U.S. Pat. No. 3,063,819 discloses fuel compositions containing an alkoxylated alkanol monoamine.

SUMMARY OF THE INVENTION

Additives are provided which in fuels maintain cleanliness of engine intake systems and do not themselves contribute to combustion chamber deposits and in lubricating oils act as dispersants. The additives are hydrocarbylpoly(oxyalkylene) polyamines soluble in a hydrocarbon fuel boiling in the gasoline range. The poly(oxyalkylene) moiety comprises at least one hydrocarbyl-terminated poly(oxyalkylene) chain of 2 to 5 carbon atom oxyalkylene units; the poly(oxyalkylene) chain is bonded through a terminal carbon atom to a nitrogen atom of a polyamine having from 2 to about 12 amine nitrogens and from 2 to about 40 carbon atoms with a carbon-to-nitrogen ratio between about 1:1 and 10:1. The hydrocarbyl group will contain from 1 to 30 carbon atoms. The compounds have molecular weights in the range of about 500 to 10,000, preferably from 800 to 5000. Certain selected additives of the present invention are believed to be useful dispersant additives for lubricating oils.

DETAILED DESCRIPTION OF THE INVENTION

The poly(oxyalkylene) polyamine of the present invention has a molecular weight from about 500 to about 10,000, preferably from about 800 to about 5000, and consists of a polyamine moiety and a poly(oxylalkylene) moiety, comprising at least one hydrocarbyl-terminated poly(oxyalkylene) polymer, bonded through a carbon-nitrogen linkage to the nitrogen atom of the polyamine. As fuel additives, the poly(oxylalkylene) moiety and the polyamine moiety are selected to provide solubility in the fuel composition and deposit control activity without contributing to octane requirement increase. As lubricating oil additives, the poly(oxyalkylene) moiety and the polyamine moiety are selected to provide solubility in lubricating oil compositions and dispersant activity.

The additives may be termed hydrocarbylpoly(oxyalkylene) polyamines, polyalkylene glycol polyamines, or for convenience, "polyether polyamines". They differ from the compounds disclosed in previously mentioned West German Application 2,401,930 in that the instant compounds are hydrocarbyl-, preferably alkyl-, terminated, in contrast to the hydroxy-termination of the prior art compounds. The result is a surprising increase in dispersancy of the hydrocarbyl "capped" compounds.

The additives are usually prepared by the reaction of a suitable hydrocarbyl-terminated polyether alcohol with a halogenating agent such as HCl, thionyl chloride, or epichlorohydrin to form a polyether chloride followed by reaction of the polyether chloride with a polyamine to form the active polyamine.

Polyamine Components

The polyamine moiety of the polyether polyamine is preferably derived from a polyamine having from 2 to about 12 amine nitrogen atoms and from 2 to about 40 carbon atoms. The polyamine, encompassing diamines, preferably has a carbon-to-nitrogen ratio of from about 1:1 to about 10:1. The polyamine will usually contain at least one primary or secondary amine nitrogen atom.

The polyamine may be sustituted with substituent groups selected from (A) hydrogen, (B) hydrocarbyl groups of from 1 to about 10 carbon atoms, (C) acyl groups of from 2 to about 10 carbon atoms, and (D) monoketo, monohydroxy, monocyano, lower alkyl and lower alkoxy derivatives of (B) and (C). "Lower", as used in lower alkyl and lower alkoxy, means a group containing about 1 to 6 carbon atoms.

"Hydrocarbyl", as used in describing all the components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted polyamines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc.; alkenyls such as propenyl, isobutenyl, hexenyl, octenyl, etc.; hydroxyalkyls, such as 2-hydroxyethyl, 3-hydroxypropyl, hydroxyisopropyl, 4-hydroxybutyl, 8-hydroxyoctyl, etc.; ketoalkyls, such as 2-ketopropyl, 6-ketooctyl, etc.; alkoxy and lower alkenoxy alkyls, such as ethoxyethyl, ethoxypropyl, propoxyethyl, propoxypropyl, 2-(2-ethoxyethoxy)ethyl, 2-(2-[2-ethoxyethoxy](ethoxy)ethyl, 3,6,9,12-tetraoxatetradecyl, etc. The acyl groups, falling within the definition of the aforementioned (C) substituents, are such as propionyl, acetyl, etc. The more preferred substituents are hydrogen, $C_1$-$C_6$ alkyls and $C_1$-$C_6$ hydroxyalkyls.

The more preferred polyamine finding use within the scope of the present invention is a polyalkylene polyamine, including alkylene diamine, and including substituted polyamines, e.g., alkyl and hydroxyalkyl-substituted polyalkylene polyamines. Preferably, the alkylene group contains from 2 to 6 carbon atoms, there being preferably from 2 to 3 carbon atoms between the nitrogen atoms. Such groups are exemplified by ethyleneamines and include ethylenediamine, diethylenetriamine, di(trimethylene)triamine, dipropylenetriamine, triethylenetetraamine, tetraethylenepentamine, and pentaethylenehexamine. Such amines encompass isomers such as branched-chain polyamines and the previously mentioned substituted polyamines, including hydroxy- and hydrocarbyl-substituted polyamines.

Among the polyalkylene polyamines, those containing 2–12 amine nitrogen atoms and 2–24 carbon atoms are especially preferred, and the $C_2$-$C_3$ alkylene polyamines are most preferred, in particular, the lower polyalkylene polyamines, e.g., ethylenediamine, tetraethylenepentamine, etc.

The amine component of the polyether polyamine also may be derived from heterocyclic polyamines, heterocycle-substituted amines and substituted heterocyclic compounds, wherein the heterocycle comprises one or more 5-6 membered rings containing oxygen and/or nitrogen. Said heterocycle may be saturated or unsaturated and substituted with groups selected from the aforementioned (A), (B), (C), and (D). The heterocycles are exemplified by piperazines, such as 2-methylpiperazine, N-(2-hydroxyethyl)piperazine, 1,2-bis-(N-piperazinyl)ethane and N,N'-bis(N-piperazinyl)piperazine, 2-methylimidazoline, 3-aminopiperidine, 2-aminopyridine, N-(3-aminopropyl)morpholine, etc. Among the heterocyclic compounds, the piperazines are preferred.

The amine component of the polyether polyamine may also be derived from an amine-containing compound which is capable of reacting with a hydrocarbyl-poly(oxyalkylene) alcohol derivative to produce the polyether polyamine.

In many instances the polyamine used as a reactant in the production of the polyether polyamine of the present invention is not a single compound, but a mixture in which one or several compounds predominate with the average composition indicated. For example, tetraethylenepentamine prepared by the polymerization of aziridine or the reaction of dichloroethylene and ammonia will have both lower- or higher-amine members, e.g., triethylene tetraamine, substituted piperazines and pentaethylenehexamine, but the composition will be mainly tetraethylenepentamine and the empirical formula of the total amine composition will closely approximate that of tetraethylene pentamine. Finally, in preparing the compounds of this invention, where the various nitrogen atoms of the polyamine are not geometrically equivalent, several substitutional isomers are possible and are encompassed within the final product. Methods of preparation of amines and their reactions are detailed in Sidgewick's *The Organic Chemistry of Nitrogen*, Claredon Press, Oxford, 1966; Noller's *Chemistry of Organic Compounds*, Saunders, Philadelphia, 2nd Ed., 1957; and Kirk-Othmer's *Encyclopedia of Chemical Technology*, 2nd Ed., especially Volume 2, pp. 99116.

Poly(oxyalkylene) Component

The hydrocarbyl-terminated poly(oxyalkylene) materials which are utilized in preparing the polyether polyamine of the present invention are monohydroxy compounds, i.e., alcohols, and are often termed monohydroxy polyethers or "capped" poly(oxyalkylene) glycols and are to be distinguished from the poly(oxyalkylene) glycols (diols) or polyols, which are not hydrocarbylterminated, i.e., capped. The hydrocarbyl-terminated poly(oxyalkylene) alcohols are produced by the addition of lower alkylene oxides such as oxirane, ethylene oxide, propylene oxide, the butylene oxides, or the pentylene oxides to the hydroxy compound ROH under polymerization conditions. Methods of production and properties of these polymers are discussed in U.S. Pat. Nos. 2,841,479, 2,782,240, and the aforementioned Kirk-Othmer's *Encyclopedia of Chemical Tech-* nology, Vol. 19, p. 507. In the polymerization reaction a single type of alkylene oxide may be employed, e.g., propylene oxide, in which case the product is a homopolymer, e.g., a poly(oxypropylene) propanol. However, copolymers are equally satisfactory and random copolymers are readily prepared by contacting the hydroxyl-containing compound with a mixture of alkylene oxides, such as a mixture of propylene and butylene oxides. Block copolymers of oxyalkylene units also provide satisfactory poly(oxyalkylene) polymers for the practice of the present invention. Random polymers are more easily prepared when the reactivities of the oxides are relatively equal. In certain cases, when ethylene oxide is copolymerized with other oxides, the higher reaction rate of ethylene oxide makes the preparation of random copolymers difficult. In either case, block copolymers can be prepared. Block copolymers are prepared by contacting the hydroxyl-containing compound with first one alkylene oxide, and then the others in any order, or repetitively, under polymerization conditions. A particular block copolymer is represented by a polymer prepared by polymerizing propylene oxide on a suitable monohydroxy compound to form a poly(oxypropylene) alcohol, and then polymerizing butylene oxide on the poly(oxypropylene) alcohol.

In general, the poly(oxyalkylene) compounds are mixtures of compounds that differ in polymer chain length. However, their properties closely approximate those of the polymer represented by the average composition and molecular weight.

The hydrocarbyl poly(oxyalkylene) moiety of the polyether polyamine consists of one or more, preferably 1–2, more preferably 1, hydrocarbyl-terminated poly(oxyalkylene) polymer composed of oxyalkylene units containing 2 to about 5 carbon atoms. The poly(oxyalkylene) polymer contains at least 5 oxyalkylene units, preferably 8–100, more preferably 10–100, and most preferably 10 to about 25 oxyalkylene units. The terminal carbon atom at the hydroxyl-end of the poly(oxyalkylene) chain may be bound directly to a nitrogen atom of the polyamine. This is preferably accomplished by first carrying out a substitution reaction so that the hydroxyl group of the poly(oxyalkylene) alcohol is replaced by a chlorine atom and then reacting the chloride with the polyamine. Alternatively, the terminal oxygen atom of the hydrocarbylpoly(oxylalkylene) alcohol, i.e., the hydroxyl oxygen atom of the alcohol, is bound to the carbon atom of a chlorohydroxypropyl group by reaction of the alcohol with epichlorohydrin. The chloride is then reacted with a polyamine to produce the hydroxy-substituted polyether polyamine of the present invention.

Preferably the oxyalkylene units contain 2 to 4 carbon atoms. The molecular weight of the hydrocarbylpropyl(oxyalkylene) moiety is preferably from about 500 to about 10,000 (representing an average maximum disubstitution of polyether on the polyamine), more preferably from about 500 to about 5000 (representing an average monosubstitution of polyether on the polyamine). The hydrocarbyl group contains from 1 to about 30 carbon atoms, preferably from 2 to about 20 carbon atoms. The hydrocarbyl moiety (R-) which terminates the poly(oxyalkylene) chain is generally derived from the monohydroxy compound (ROH) which is the initial site of the alkylene oxide addition in the polymerization reaction. Such monohydroxy compounds are preferably aliphatic or aromatic alcohols of from 1 to about 30 carbon atoms, more preferably an alkanol or an alkylphenol, and most preferably an alkylphenol wherein the alkyl is a straight or branched chain of from 1 to about 24 carbon atoms. One such preferred alkyl group is obtained by polymerizing propylene to an average of 4 units and has the common name of "propylene tetramer." The preferred material may be termed either an "alkylphenyl poly(oxyalkylene) alcohol" or a "polyalkoxylated alkylphenol."

In the practice of this invention it is preferred that at least some of the oxyalkylene units are $C_3$–$C_5$ oxyalkylene units to provide hydrocarbon solubility, preferably branched $C_3$–$C_5$ oxyalkylene units are present in at least sufficient number to render the hydrocarbyl-terminated poly(oxyalkylene) polyamine soluble in the fuel and/or lubricating compositions of this invention. The solubility condition is satisfied for fuel compositions if the polyether polyamine is soluble in hydrocarbons boiling in the gasoline range at least to the extent of about 30–2000 ppm by weight. The solubility condition is satisfied for lubricating oil compositions if the polyamine is soluble in oils of lubricating viscosity (i.e., 35–50,000 Saybolt Universal Studios at 100° F.) at from about 0.01 to 5 percent by weight of the lubricating oil composition. Lubricating oil solubility is generally achieved by limiting the polymer to 20% or less of polyoxyethylene units by weight, the remainder being substantially made up of $C_3$–$C_5$ units.

The structures of the $C_3$–$C_5$ oxyalkylene units are any of the isomeric structures well known to the organic chemist, e.g., n-propylene, $-CH_2CH_2CH_2-$; isopropylene, $-CH(CH_3)CH_2-$; n-butylene, $-CH_2CH_2CH_2CH_2-$; sec.-butylene, $-CH(CH_2CH_3)CH_2-$; tert.-butylene, $-C(CH_3)_2CH_2-$; disec.-butylene, $-CH(CH_3)CH(CH_3)-$; isobutylene, $-CH_2CH(CH_3)CH_2$, etc. The preferred poly(oxyalkylene) compounds are composed, at least in part, of the branched oxyalkylene isomers, particularly oxy(isopropylene), and oxy(sec.-butylene) units which are obtained from 1,2-propylene oxide and 1,2-butylene oxide, respectively.

Preparation of the Polyether Amines

The additives of this invention may be most conveniently prepared, as has been previously noted, by reaction of the poly(oxyalkylene) alcohol with an agent which will replace the terminal hydroxyl with a halogen, followed by reaction of the product with a suitable polyamine. Suitable halogenating agents include HCl, thionyl chloride, phosphorus chlorides, etc. The reaction with epichlorohydrin is carried out in substantially the same manner with like reaction times, the product being a hydroxychloride.

The reaction of the poly(oxyalkylene) alcohol with the halogenating reagents is carried out substantially on an equimolar basis, although an excess of thionyl chloride is not detrimental. The reaction may be carried out at temperatures from 0° to 150° C., preferably in the range of from 6 to 10 hours.

A solvent may be used in the halogenation reaction. Suitable solvents include benzene, toluene, etc.

The reaction of the polyether halide with the polyamine may be carried out near or in solution. The molar ratio of polyamine to polyether halide will usually be in the range of 0.5:1 to 5:1. Temperatures of from 50° to 200° C., preferably 100° to 170° C., may be utilized. The desired product may be obtained by water wash and stripping, usually by the aid of vacuum, of any residual solvent.

Since there may be more than one nitrogen atom of the polyamine which is capable of reacting with the chloride, the hydrocarbyl poly(oxyalkylene) polyamine contains at least one hydrocarbyl poly(oxyalkylene) polymer chain bonded to the nitrogen atom of a polyamine, but the product may contain from 1 to 2 or more such chains. It is preferred that the hydrocarbyl poly(oxyalkylene) polyamine product contain, on the average, about 1 polyether chain per molecule, although it is understood that this reaction route may lead to mixtures containing appreciable amounts of di- or higher poly(oxyalkylene) chain substitution on a polyamine containing several reactive nitrogen atoms. To avert di- or higher substitution on the polyamine, a large excess of polyamine may be contacted with the polyether halide. It is preferred that the polyether polyamine contain at least one primary or secondary amine nitrogen atom.

The mol ratio of the polyether halide to polyamine will generally be in the range from about 0.2 to 20 mols of amine per mol of halide, and more usually 0.5 to 5 mols of amine per mol of halide. The mol ratio will depend upon the particular polyether halide and the desired ratio of polyether to amine. If suppression of the polysubstitution of the alkylene polyamines is desired, large mol excesses of the amine will be used.

The reaction or reactions may be conducted with or without the presence of a reaction solvent. A reaction solvent is generally employed whenever necessary to reduce the viscosity of the reaction product. These solvents should be stable and inert to the reactants and reaction product. Preferred solvents include aliphatic or aromatic hydrocarbons. Depending on the temperature of the reaction, the particular polyether chloride used, the mol ratios and the particular amine, as well as the reactant concentrations, the time may vary from ¼ to 24 hours, more usually from about 2 to 3 hours. Times greatly in excess of 3 hours do not particularly enhance the yield and may lead to undesirable degradation, especially at higher temperatures. It is, therefore, preferred to limit the reaction time to less than 3 hours.

After the reaction has been carried out for a sufficient length of time, the reaction mixture may be subjected to extraction with an alcohol, a hydrocarbon-water or a hydrocarbon-alcohol-water medium to free the product from any low-molecular-weight amine salts which have formed and any unreacted alkylene polyamines. Alcohols with limited water solubility are preferred extractants. The product may then be isolated by evaporation of the solvent. Small amounts of halogen may be present as the hydrohalide salt of the polyether amines.

Depending on the particular application of the composition of this invention, the reaction may be carried out in the medium in which it will ultimately find use, e.g., polyether carriers, and be formed at concentrations which provide a concentrate of the detergent composition. Thus, the final mixture may be in a form to be used directly for blending in fuels.

A class of preferred polyether polyamines may be described by the following formula:

pyrrolidinyl, imidazolidinyl, piperazinyl, piperidino, morpholino, etc.; wherein said heterocyclic radical may be substituted with substituents selected from the aforementioned (A), (B), (C), and (D) groups of substituents. The remaining $R^3$ groups are the same or different substituents selected from the aforementioned (A), (B), (C) and (D) groups of substituents, and a poly(oxyalkylene) group of the formula $R{-}(OC_gH_{2g}){-}j$ in which g is an integer of from 2 to 5; j is an integer such that the molecular weight of the poly(oxyalkylene) group is from about 500 to about 5000, and R is a hydrocarbyl group of from one to about 30 carbon atoms. $R^1$ is the same or different alkylene or hydroxy-substituted alkylene radical of 2 to 6 carbon atoms, $R^2$ is carbonyl, alkylene carbonyl or alkylene of 2 to 4 carbon atoms with vicinal linkages, at least one, and preferably no more than one, of the $R^3$ groups is the poly(oxyalkylene) group, and a sufficient number of the oxyalkylene units, $-(OC_gH_{2g}){-}$, are branched $C_3$–$C_5$ oxyalkylene units to render the compounds soluble in the fuel or lubricating oil composition. a is 0 or 1, preferably 1; b is an integer from 0 to 4, preferably from 0 to 2; c is 0 or 1, preferably 0; d is 0 or 1, preferably 0; e is 0 or 1, preferably 1; and f is 0 or 1, and equal to 1 when c is 0. It is also provided that the sum of $f+b+2c+e$ is equal to or greater than 2.

Compositions

The polyether amines will generally be employed in a hydrocarbon distillate fuel. The proper concentration of additive necessary in order to achieve the desired detergency and dispersancy varies depending upon the type of fuel employed, the presence of other detergents, dispersants and other additives, etc. Generally, however, from 30 to 2000 weight parts per million, preferably from 100 to 700 ppm, of polyether polyamine per part of base fuel is needed to achieve the best results. When other detergents are present, a lesser amount of polyether polyamine may be used. For performance as a carburetor detergent, lower concentrations, for example, 30 to 70 parts per million, may be preferred.

The oils which find use in this invention as base oils of the lubricating composition are oils of lubricating viscosity derived from petroleum or synthetic sources. Oils of lubricating viscosity normally have viscosities in the range of 35 to 50,000 Saybolt Universal Seconds (SUS) at 100° F., and more usually at from about 50 to 10,000 SUS at 100° F. Examples of such base oils are naphthenic base, paraffin base, and mixed base mineral oils, synthetic oils, for example, alkylene polymers, such as polymers of propylene, butylene, etc. and mixtures thereof; alkylene oxidetype polymers; dicarboxylic esters, phosphorus esters, silicone esters, such as silicates and polysiloxanes; and alkyl aromatic hydrocarbons.

Usually included in the oils besides the subject additives are such additives as dispersants/detergents, rust inhibitors, antioxidants, oiliness agents, foam inhibitors, viscosity index improvers, pour point depressants, etc. Usually these other additives will be present in the

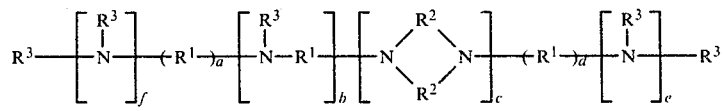

wherein two $R^3$ groups attached to the same nitrogen atom may form a 5-6 membered saturated or unsaturated nitrogen heterocyclic radical, such as pyrrolyl, range of from about 0.1 to 20 weight percent, more usually of from about 0.5 to 15 weight percent of the total composition. Generally, each of the additives will be present in the range from about 0.01 to 5 weight percent of the total composition. In concentrates, the weight percent of these additives will usually range from about 0.3 to 30 weight percent. A preferred aspect of the use of the compositions of this invention is to include in the oil from about 1 to about 50 mM/kg of a dihydrocarbyl phosphorodithioate, wherein the hydrocarbyl groups are from about 4 to 36 carbon atoms. Usually the hydrocarbyl groups will be alkyl or alkaryl groups. The remaining valence of the phosphorodithioate will usually be satisfied by zinc, but polyoxyalkylene or a third hydrocarbyl group may also be used.

In the preferred embodiments of the present invention, the lubricating oil composition will contain sufficient alkaline earth metal carbonate dispersed in the composition to provide an alkalinity value of from 0.5 to 100 mg KOH/g.

The preferred alkaline earth metal carbonate dispersants are the sulfonates and phenates.

The alkalinity value of the overbased dispersant will usually be at least 150 and not exceed 500, more usually being in the range of about 200 to about 450 mg KOH/g. The equivalent ratio of base to dispersant will be at 1:1, and more usually 1.5:1, normally not exceeding about 20:1.

The subject additive may be formulated as a concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the subject additive. In the concentrate, the amount of the additive will be ordinarily at least 10% by weight and generally not exceed 70% by weight and preferably from 10 to 50 weight percent. The concentrate may also contain 5–80 weight percent of a poly(oxyalkylene) alcohol, glycol or polyol.

In gasoline fuels, other fuel additives may also be included such as antiknock agents, e.g., methylcyclopentadienyl manganese tricarbonyl, tetramethyl or tetraethyl lead, or other dispersants or detergents such as various substituted succinimides, amines, etc. Also included may be lead scavengers such as aryl halides, e.g., dichlorobenzene or alkyl halides, e.g., ethylene dibromide. Additionally, antioxidants, metal deactivators and demulsifiers may be present.

A particularly useful additive is a fuel-soluble carrier oil. Exemplary carrier oils include nonvolatile poly(oxyalkylene) alcohols, diols (glycols), and polyols; other synthetic lubricants or lubricating mineral oil. Particularly preferred carrier oils are poly(oxyalkylene) mono- and polyols, such as the Pluornics marketed by BASF Wyandotte Corp., and the UCON LB-series fluids marketed by Union Carbide Corp. When used, these oils are believed to act as a carrier for the detergent and assist in removing and retarding deposits. They are employed in amounts from about 0.05 to 0.5 percent by volume, based on the final gasoline composition.

Although the fuel and lubricating oil additives of this invention have been described in terms of polyamine and poly(oxyalkylene) components, as in known to those of skill in the art, there are other methods of preparing the polyether polyamines. The present invention is in no way limited by the manner of making the polyether polyamine.

EXEMPLIFICATION

The following examples are presented to illustrate specific embodiments of the practice of this invention and should not be interpreted as limitations upon the scope of the invention.

EXAMPLE 1—Preparation of Butyl-Capped Polyether-Substituted Diethylenetriamine Butylpoly(oxypropylene) alcohol, i.e., polypropylene glycol monobutyl ether (hydroxyl number 31 mg KOH/g, 500 g), and hydrochloric acid (37%, 400 g) were combined and heated at reflux under nitrogen for 20 hours. The reaction mixture was cooled, diluted with 2 parts of petroleum ether and washed repeatedly with water until no chloride was detected with silver nitrate. The organic phase was stripped on the rotary evaporator. The residue (416 g) had % chlorine, 0.38%; hydroxyl number, 26 mg KOH/g. Based on 1810 molecular weight, the chlorine content was 20% of theory.

The chloride thus obtained (290 g., 106 mmols) was combined with diethylenetriamine (56 g, 540 mmols) and the mixture was heated to 160° C. with stirring for 5 hours. The crude product was diluted with an equivalent volume of n-butanol and was washed 4 times with 200 ml of hot water. The organic phase was stripped of butanol on the rotary evaporator. The residue (197 g), a brown oil, had % N, 0.23%, % Cl, 0.04%.

Based on the starting-material molecular weight of 1810, the product (Compound I) contained about 10% of the theoretical nitrogen for butyl(polyoxypropylene) diethylenetriamine. Molecular weight determined by osmometry was 1372.

EXAMPLE 2—Preparation of Hydroxy-Terminated Polyether-Substituted Diethylenetriamine Polypropylene glycol (hydroxyl number 56 mg KOH/g, 500 g, molecular weight 2000) was treated as above. The chloride contained 0.65% Cl and had a hydroxyl number of 59. 466 g were recovered. Based on a 2,000 molecular weight for the starting material, the chlorine content was 36% of theory for the mono-chloro-mono-hydroxy poly(oxypropylene).

The chloride (200 g) was treated with diethylenetriamine as above, and provided a product (II) with 0.44% nitrogen (21% of theory) and 0.09% chlorine. The molecular weight was determined to be 1408. This is entitled Compound II.

EXAMPLE 3—Preparation of Butyl-Capped Polyether-Substituted Diethylenetriamine Butylpoly(oxypropylene) alcohol, i.e., polypropylene glycol monobutyl ether (hydroxyl number 31 mg KOH/g, calculated molecular weight 1810; 2200 g, 1.215 mols), and Celite (24 g) were combined in a 5-liter, 3-neck flask equipped with nitrogen inlet, mechanical stirrer, addition funnel, reflux condenser and thermometer. Thionyl chloride (217 g, 1.82 mols) was added in a slow stream with stirring. The mixture was heated to 80°–90° C. for 5 hours, and then allowed to cool under a nitrogen blanket. The reaction mixture was diluted with benzene (1 liter), filtered through Celite and was stripped of most of the benzene and excess thionyl chloride on the rotary evaporator. A small analytical sample was stripped of all solvent and was found to contain 1.46% chlorine, 0.28% sulfur, and had a molecular weight of 1502.

The chloride prepared above (2100 g, 1.15 mols based on starting material molecular weight) was added to diethylene triamine (626 g, 6.08 mmols) and xylene (approximately 1 liter) and was heated to 160° C. for 5 hours.

The mixture was cooled to 80° C., filtered from amine hydrochloride precipitate, and the filtrate was stripped of xylene on the rotary evaporator. n-Butanol (1 liter) was added and the product was washed 3 times with hot water (85° C., 1 liter). n-Butanol was removed on the rotary evaporator. Analysis revealed 0.41% chlorine and 0.54% nitrogen in the product.

The partially aminated product (2,000 g) was combined with diethylenetriamine (475 g) and xylene (500 ml) and heated to 165° C. for an additional 5 hours. Work-up as before provided butylpoly(oxypropylene) diethylenetriamine (III); % N: 0.88; % Cl: 0.04. Based on the molecular weight of the starting material, conversion was 40%. This is entitled Compound III.

In order to compare the surfactant properties of PPG amines capped with alkyl and hydroxy groups on the non-amine terminus, the aminated polymers were separated from the unreacted starting material and by-products. Compounds I-III (from Examples 1 to 3) were chromatographed on silica gel, eluting with (A) ethyl acetate, (B) 20% methanol in ethyl acetate, and (C) 10% isopropylamine, 20% methanol in ethyl acetate. The third eluate contained the active amine surfactant. This fraction was analyzed.

The additives were evaluated in a laboratory dispersancy test. The hexane-insoluble, chloroform-soluble portion of sludge scraped from the crankcase of high-mileage engines was added as a chloroform solution to a typical base gasoline containing varying amounts of the test additive. The concentration of additive necessary to prevent coagulation and precipitation of the sludge at 10 and 30 minutes was measured.

Table I sets forth these results.

TABLE I

| Compound No. | Dispersancy Cutoff | |
|---|---|---|
| | 10 Minutes Conc., ppm | 30 Minutes Conc., ppm |
| I | 175 | 300 |
| II | Higher than 400 | Much higher than 400 |
| III | 50 | 175 |

The data in Table I show that the butyl-terminated polyether amine prepared with HCl (as per the method described in the West German application) is decidedly superior in dispersancy to the hydroxy-terminated material prepared by the same method. The data also show that the butyl-terminated material prepared with thionyl chloride is superior to both other materials.

EXAMPLE 4—Preparation of Butyl-Capped Polyether-Substituted Ethylenediamine 2000 g of Union Carbide UCON LB 385 [a butyl-terminated poly(oxypropylene) alcohol having a molecular weight of about 1450] was charged to a 3-neck, 5-liter flask. 60 g of Celite were added. The mixture was stirred slowly, and 250 g of thionyl chloride were added. The temperature rose to 35° C. The reaction mixture was heated to 85° C. and stirred for 3 hours. The mixture was filtered while it was still hot through a ⅜-inch pad of Celite in a sintered glass funnel. It was recharged to a 3-neck flask, and 500 cc benzene were added. The mixture was heated, and the solvent was distilled off to 160° C. The chlorine content was 1.51%.

180 g of ethylenediamine and 180 g of xylene were charged to a 3-neck flask. The mixture was heated to reflux (75° C.) and an 835-g portion of the previously prepared chloride was added at a rate so as to allow the temperature to drop no more than 5° C. (to 110° C.). The reaction mixture was refluxed at 125° C. for two hours. The ethylenediamine was distilled off to 150° C., and the mixture was refluxed at 150° C. for 5 hours.

The reaction product was decanted to a separatory funnel, and a 200-ml bottom layer was drawn off and discarded. 2000 ml of butyl alcohol and 750 ml of water were added to the flask. The mixture was stirred and heated to 85° C. It was then placed in a separatory funnel, and 300 ml water were removed. No further separation occurred, so the mixture was returned to the flask and washed with 750 ml of 3% caustic. The water wash was repeated, and the solvent was stripped off with vacuum. The mixture had a chlorine content of 0.75%; nitrogen, 0.59%; and sulfur, 0.36%.

EXAMPLE 5—Preparation of Butyl-Capped Polyether-Substituted Piperazine

A 33.6-g (0.39 mol) portion of piperazine was charged to a 500-ml, 3-neck flask equipped with an inlet for a dry nitrogen sweep. The temperature was raised to 110° C. to melt the piperazine. A 90-g (0.039 mol) portion of a chloride prepared as in Example 4 from Union Carbide UCON LB 685 [a butyl-terminated poly(oxypropylene) alcohol having a molecular weight of about 1800] was added dropwise over 1 hour with stirring. The temperature was raised to about 145° C. and stirring was continued for 4 hours. 200 ml of n-butanol was added to the product. The product was washed 3 times with 300-ml portions of hot water. The product was filtered and the solvent removed by evaporation. The product was 56 g of an amine which gave total nitrogen analyses of 0.41, 0.48%. A dispersancy run according to the previously described test procedure gave 400 ppm at 10 minutes, 800 ppm at 30 minutes.

EXAMPLE 6—Preparation of Butyl-Capped Polyether-Substituted N-(2-aminoethyl)piperazine 90.0 g (0.039 mol) of the chloride described in Example 5 was reacted with 51 ml of N-(2-aminoethyl)piperazine. The reaction was carried out by substantially the same procedure as in Example 5, except that initial melting of the amine was not required. The yield was 71.4 g of amine which gave a dispersancy result of 800 ppm at 20 minutes (see Table I).

In order to illustrate the difference between polyether amine and polyether polyamine, the following were synthesized, according to the methods of the foregoing examples: (A) alkylphenylpoly(oxybutylene)ethylenediamine, MW 1500, (B) alkylphenylpoly(oxybutylene)amine (from ammonia), MW 1500, and (C) alkylphenylpoly(oxybutylene)dimethylamine, MW 1500. The additives were evaluated in the aforementioned laboratory dispersancy test. The minimum concentrations necessary to disperse sludge at 30 minutes was (A) less than 400 ppm, (B) greater than 3200 ppm, and (C) greater than 3200 ppm. In this manner, the superiority of the polyether polyamine over the polyether monoamine in the fuel and lubricating oil compositions of this invention was established.

A number of polyether amines prepared by the method of Example 4 were blended in gasoline and their deposit-reducing capacity tested in an ASTM/CFR Single-Cylinder Engine Test.

In carrying out the tests, a Waukesha CFR single-cylinder engine is used. The run is carried out for 15 hours, at the end of which time the intake valve is removed, washed with hexane and weighed. The previously determined weight of the clean valve is subtracted from the weight of the deposit, with a lesser amount of deposit measured connoting a superior additive. The operating conditions of the test are as follows: water jacket temperature 100° C. (212° F.); manifold vacuum of 12 inches Hg, intake mixture temperature of 50.2° C. (125° F.); air-fuel ratio of 12; ignition spark timing of 40° C. BTO; engine speed is 1800 rpm; the crankcase oil is a commercial 30W oil. The amount of carbonaceous deposit in milligrams on the intake valves is measured and reported in the following Table II.

The base fuel tested in the above extended detergency test is a regular-octane unleaded gasoline containing no fuel detergent additives. The samples are designated by the term PPG followed by the molecular weight of the monobutyl-capped poly(oxypropylene) side chain and the amine employed, e.g., PPG 1450 diethylenetriamine.

TABLE II

| INTAKE VALVE DEPOSIT TESTS[1] | | | |
|---|---|---|---|
| Additive, Carrier Description | PPM | Average Washed Deposit, MG | |
| | | 11A Engine | 12A Engine |
| Base Fuel | — | 275[2] | 103[3] |
| PPG-1800 Diethylenetriamine | 500 | 5 | 9 |
| PPG-1450 Diethylenetriamine | 500 | 28 | 53 |
| PPG-1800 Diethylenetriamine | 312 | 11 | 29 |
| PPG-1450 | 88 | | |

[1]Single evaluations unless noted.
[2]Average of 8 runs.
[3]Average of 4 runs.

The above results show the significant reduction in valve deposits achieved compared with base fuel.

The tendency of the additives to contribute to ORI was evaluated in a laboratory engine test. The test engine is a CLR single-cylinder, balanced, high-speed, four-cycle engine designed primarily for oil test and research work. It is manufactured by the Laboratory Equipment Corporation of Mooresville, Indiana. The major engine dimensions are:

| Bore | 3.90 In. |
|---|---|
| Stroke | 3.74 In. |
| Displacement | 42.5 Cu. In. |
| Compression Ratio | 8:1 |

The carburetor, intake manifold, and distributor have been slightly modified to facilitate our test procedure. These modifications have made the engine's ORI characteristics comparable to modern-day automobiles.

The test procedure involves engine operation for 80 hours (24 hours a day) on a prescribed load and speed schedule representative of typical vehicle driving conditions. The cycle for engine operation during the test is as follows:

TABLE III

| Deposit Accumulation - Cycle CLF Single Cylinder | | | |
|---|---|---|---|
| Mode | Time in Mode, Sec. | Manifold Vacuum, In. Hg | Engine Speed rpm |
| 1. Idle | 140 | 16 | 900 |
| 2. Heavy Cruise, Low Speed | 70 | 7 | 2000 |
| 3. Light Cruise, Low Speed | 140 | 13 | 2000 |
| 4. Deceleration | 140 | 18 | 1800 |
| 5. Heavy Cruise, Low Speed | 70 | 7 | 2000 |
| 6. Light Cruise, Low Speed | 140 | 13 | 2000 |
| 7. Idle | 210 | 16 | 900 |
| 8. Heavy Cruise, Low Speed | 70 | 7 | 2000 |
| 9. Light Cruise, Low Speed | 70 | 13 | 2000 |
| 10. Heavy Cruise, High Speed | 70 | 9 | 2500 |
| 11. Light Cruise, High Speed | 140 | 15 | 2500 |
| 12. Deceleration | 140 | 18 | 1800 |

All of the test runs were made with the same base gasoline, which was representative of commercial unleaded fuel.

The results are set forth in Table IV. The designations of the additives are the same as in Table II.

TABLE IV

| LABORATORY ORI TEST RESULTS | | | | |
|---|---|---|---|---|
| Test | Additive Carrier Description | Concentration PPM | Combustion Chamber Deposits, g | ORI |
| 1 | (None) | — | 1.1 | 2.7 |
| 2 | Commercially available Nitrogen-containing DC Additive Mineral Carrier Oil | 400 1600 | 1.9 | 5.2 |
| 3 | Same as 2 DC Additive Mineral Carrier Oil | 250 1000 | 2.3 | 5.5 |
| 4 | PPG-1800 Diethylenetriamine | 500 | 1.4 | 2.9 |
| 5 | (None) | — | 0.8 | 3.0 |
| 6 | (Same as 4) | 500 | 1.1 | 2.9 |

The test for evaluating the ability of fuel additives to control carburetor deposits employs a 1973 model year, 240 CID, 6-cylinder Ford engine. The internal bore of the carburetor throttle body is equipped with a thin, a removable aluminum sleeve. The difference between sleeve weights determined before and after an engine run represents the change in amount of surface deposit occurring during that run.

For additive evaluation, two test phases are run as set forth in Table V.

TABLE V

| CARBURETOR DEPOSIT TEST PROCEDURE | |
|---|---|
| 1. Dirty-Up Phases (Starting With Clean Sleeve) | |
| Objective: | Establish deposits on carburetor sleeve. |
| Duration: | 15 hours. |
| Operating Cycle: | 7 minutes moderate load and speed, 4 minutes idle |
| Engine Setup: | Crankcase blowby gases routed to carburetor air inlet. |
| Fuel: | Deposit-forming fuel containing heavy FCC component. |
| Evaluation: | Sleeve weights are determined at the beginning and end of the dirty-up phase, and sleeve deposits are rated visually on a scale of 0 to 10 (10 = clean). |
| 2. Cleanup Phase (Begins With Sleeve Deposits Formed During Dirty-Up Phase) | |
| Objective: | Measure additive performance in cleaning up deposits. |
| Duration: | 44 hours. |
| Operating Cycle: | Same as dirty-up phase. |
| Engine Setup: | Crankcase blowby gases diverted from |

TABLE V-continued

CARBURETOR DEPOSIT TEST PROCEDURE

| | |
|---|---|
| Fuel: | carburetor inlet - EGR shutoff. Commercial-type gasoline containing additive under test. |
| Evaluation: | The sleeve reweighed and rerated visually. Differences between initial and final values represent additive effectiveness. |

Table VI presents average values for the performance of PPG-amine additives. Also presented are values for a commercial deposit control additive having recognized performance in the field. Deposit level changes with a commercial-type unleaded gasoline without additive are also shown.

TABLE VI

CARBURETOR TEST RESULTS

| | | | Average Additive Performance | | | |
|---|---|---|---|---|---|---|
| | | Concentration, | Deposit Weight Reduction, | Visual Deposit Rating [1] | | |
| | Runs | ppm Active | % | Initial | Final | Diff. |
| PPG 1800 EDA* | 1 | 250 | 93 | 3.8 | >8.4 | 4.6 |
| PPG 1800 DETA** | | 150 | 89 | 5.7 | >8.4 | 2.7 |
| PPG 1800 DETA (active fraction) | 4 | 125 | 95 | 5.5 | >9.0 | 3.5 |
| PPG 900 DETA | 1 | 150 | 91 | 3.8 | >8.4 | 4.6 |
| Commercial Additive (as in Table IV) | 6 | 125 | 89 | 5.4 | >8.5 | 3.1 |
| None | 2 | — | 63 | 4.6 | >6.0 | 1.4 |

[1]Visual Deposit rating (10 = clean).
*Ethylenediamine
**Diethylenetriamine

These data show that the polyether polyamines are as effective carburetor deposit control additives as the recognized commercial additive.

The three additives tested gave carburetor deposit weight reductions ranging from 85%–95% and improvements in visual deposit ratings from initial levels of 5 to final levels as high as 9 on a scale of 10.

All specific embodiments of the invention have been described in detail, and it should be understood that the invention is to be given the broadest possible interpretation within the terms of the following claims.

What is claimed is:

1. A fuel composition comprising a major portion of hydrocarbon boiling in the gasoline range, and from 30 to about 2,000 ppm of a hydrocarbylpoly(oxyalkylene) polyamine of molecular weight from about 500 to about 10,000; wherein said hydrocarbyl group contains from 1 to about 30 carbon atoms, said poly(oxyalkylene) moiety comprises 8–100 oxyalkylene units selected from oxyalkylene units having from 2 to 5 carbon atoms at least a sufficient number of said oxyalkylene units being branched $C_3$–$C_5$ oxyalkylene units to render said hydrocarbylpoly(oxyalkylene) polyamine soluble in said fuel composition, and said polyamine moiety comprises from 2 to about 12 amine nitrogen atoms and from 2 to 40 carbon atoms.

2. A fuel composition according to claim 1 in which said oxyalkylene units are selected from oxyalkylene units having from 3 to 4 carbon atoms.

3. A fuel composition according to claim 1 in which said hydrocarbylpoly(oxyalkylene) polyamine has a molecular weight of about 800 to about 5,000.

4. A fuel composition according to claim 1 in which said hydrocarbyl group contains from 2 to 20 carbon atoms.

5. A fuel composition according to claim 1 in which said hydrocarbyl group is selected from butyl and alkylphenyl groups.

6. A fuel composition according to claim 1 in which said polyamine moiety is derived from lower polyalkylene polyamines and contain at least one primary or secondary amine nitrogen atom.

7. A fuel composition according to claim 6 in which said lower polyalkylene polyamine is ethylenediamine or diethylenetriamine.

8. Compounds of the formula

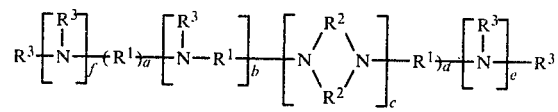

wherein two $R^3$ groups attached to the same nitrogen atom may be taken together to form a 5–6 membered ring heterocyclic radical; wherein $R^3$ may be the same or different and selected from hydrogen, hydrocarbyl from 1 to 10 carbon atoms, hydrocarbonyl of 2 to 10 carbon atoms and a poly(oxyalkylene) group of the formula $R$–$(OC_gH_{2g})_j$ in which g is an integer from 2 to 5, j is an integer such that the molecular weight of the poly(oxyalkylene) group is from about 500 to about 5000, and R is a hydrocarbyl group of from 1 to about 30 carbon atoms; $R^1$ is the same or different alkylene or hydroxy-substituted alkylene group of 2 to 6 carbon atoms, $R^2$ is carbonyl, alkylene carbonyl or alkylene of 2 to 4 carbon atoms with vicinal linkages; wherein at least one of the $R^3$ groups is the poly(oxyalkylene) group, and at least a sufficient number of the oxyalkylene units, $(OC_gH_{2g})$, are branched-chain $C_3$–$C_5$ units to render the compound soluble in oils of lubricating viscosity or hydrocarbons boiling in the gasoline range; and wherein a is 0 or 1, b is an integer from 0 to 4, c is 0 or 1, d is 0 or 1, f is 0 or 1 and equal to 1 when c is 0, and f+b+2c+e is equal to or greater than 2.

9. A compound of claim 8 in which $R^1$ is propylene or ethylene.

10. Compounds of claim 8 in which c and d are equal to 0 and $R^1$ is selected from propylene and ethylene.

11. A fuel composition comprising a major portion of hydrocarbon boiling at the gasoline range and from 30 to 2000 ppm of the compond of claim 8.

12. A fuel composition comprising a major portion of hydrocarbon boiling in the gasoline range and from 30 to 2,000 ppm of the compound of claim 10.

13. The fuel composition of claim 1 which also contains from 100 to 5000 ppm of a fuel-soluble poly(oxyalkylene) alcohol, glycol or polyol.

14. The fuel composition of claim 13 in which the poly(oxyalkylene) is poly(oxypropylene).

15. A concentrate comprising an inert, stable oleophilic organic solvent boiling in the range from 150° to 400° F. and from 10 to 50 weight percent of the compound of claim 1.

16. A concentrate according to claim 15 which also contains poly(oxyalkylene) alcohol, glycol or polyol in the amount from 5 to 80 weight percent.

* * * * *